US012803169B2

(12) United States Patent
Kawabe

(10) Patent No.: US 12,803,169 B2
(45) Date of Patent: Nov. 17, 2026

(54) MULTILAYER SUBSTRATE

(71) Applicant: Murata Manufacturing Co., Ltd., Nagaokakyo (JP)

(72) Inventor: Kentarou Kawabe, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 54 days.

(21) Appl. No.: 18/918,370

(22) Filed: Oct. 17, 2024

(65) Prior Publication Data

US 2025/0038413 A1 Jan. 30, 2025

Related U.S. Application Data

(63) Continuation of application No. PCT/JP2023/010031, filed on Mar. 15, 2023.

(30) Foreign Application Priority Data

Apr. 25, 2022 (JP) ................................ 2022-071274

(51) Int. Cl.
*H01Q 9/04* (2006.01)

(52) U.S. Cl.
CPC ................................ *H01Q 9/0407* (2013.01)

(58) Field of Classification Search
None
See application file for complete search history.

(56) References Cited

U.S. PATENT DOCUMENTS 5,926,136 A * 7/1999 Ohtsuka .............. H01Q 9/0407 343/873
2017/0353338 A1* 12/2017 Amadjikpe .......... H01Q 21/245
(Continued)

FOREIGN PATENT DOCUMENTS

JP 2001060823 A * 3/2001
JP 2007-097115 A 4/2007
(Continued)

OTHER PUBLICATIONS

International Search Report and Written Opinion mailed on May 30, 2023, received for International Application No. PCT /JP2023/010031, filed on Mar. 15, 2023, 11 pages including English Translation.

(Continued)

*Primary Examiner* — Dameon E Levi
*Assistant Examiner* — Anh Ho
(74) *Attorney, Agent, or Firm* — XSENSUS LLP

(57) ABSTRACT

A second radiating conductor layer is provided to a multilayer body to be in contact with a second insulator layer, is positioned in a positive direction of a Z-axis relative to a first radiating conductor layer, and overlaps the first radiating conductor layer assuming it is viewed in the Z-axis direction. A frequency of an electromagnetic wave radiated or received by the second radiating conductor layer is higher than a frequency of an electromagnetic wave radiated or received by the first radiating conductor layer, or an area of the second radiating conductor layer is smaller than an area of the first radiating conductor layer. A first planar ground conductor layer is positioned in a negative direction of the Z-axis relative to the first radiating conductor layer, and overlaps the first radiating conductor layer and the second radiating conductor layer assuming it is viewed in the Z-axis direction.

18 Claims, 8 Drawing Sheets

(56) References Cited

U.S. PATENT DOCUMENTS

| | | | | |
|---|---|---|---|---|
| 2020/0106192 | A1* | 4/2020 | Avser | H01Q 1/405 |
| 2020/0303821 | A1* | 9/2020 | Lee | H01Q 5/335 |
| 2021/0057820 | A1* | 2/2021 | Sudo | H01Q 1/2283 |
| 2021/0151899 | A1* | 5/2021 | Park | H01Q 5/385 |
| 2021/0320417 | A1* | 10/2021 | Lee | H01Q 21/065 |

FOREIGN PATENT DOCUMENTS

| | | | | | |
|---|---|---|---|---|---|
| JP | 2007531436 | A | * | 11/2007 | H01Q 9/0407 |
| JP | 2008072659 | A | | 3/2008 | |
| JP | 2020-178246 | A | | 10/2020 | |
| JP | 2021-520743 | A | | 8/2021 | |
| WO | 2018/225537 | A1 | | 12/2018 | |
| WO | WO-2019076928 | A1 | * | 4/2019 | H01Q 1/48 |
| WO | 2019/188471 | A1 | | 10/2019 | |

OTHER PUBLICATIONS

Notice of Reasons for Refusal mailed Mar. 11, 2025, in Japanese Application No. 2024-517899, 7 pages.

Office Action issued on May 13, 2025, in corresponding Japanese patent Application No. 2024-517899, 5 pages.

* cited by examiner

MULTILAYER SUBSTRATE

CROSS-REFERENCE TO RELATED APPLICATIONS

This is a continuation application of PCT/JP2023/010031, filed on Mar. 15, 2023, designating the United States of America, which is based on and claims priority to Japanese Patent Application No. JP 2022-071274 filed on Apr. 25, 2022. The entire contents of the above-identified applications, including the specifications, drawings and claims, are incorporated herein by reference in their entirety.

TECHNICAL FIELD

The present disclosure relates to a multilayer substrate including a plurality of radiating conductor layers.

BACKGROUND ART

A patch antenna described in Patent Document 1 is known as an disclosure related to an antenna element in the related art. The patch antenna includes a dielectric block, a ground electrode, a non-driven electrode, a radiating electrode, and a coupling electrode. The dielectric block has a disk shape having an upper main surface and a lower main surface. The ground electrode is provided on the lower main surface of the dielectric block. The radiating electrode is provided in the vicinity of a center of the upper main surface of the dielectric block. The non-driven electrode is provided on the upper main surface of the dielectric block. The non-driven electrode has an annular shape surrounding the radiating electrode assuming it is viewed in an up-down direction. The coupling electrode is provided on a side surface of the dielectric block. The coupling electrode electrically couples the ground electrode and the non-driven electrode. In the patch antenna described above, the radiating electrode transmits and receives a radio frequency signal.

CITATION LIST

Patent Document

Patent Document 1: Japanese Unexamined Patent Application Publication No. 2007-97115

SUMMARY OF DISCLOSURE

Technical Problem

In the patch antenna described in Patent Document 1, there is a case that it is desired to provide a plurality of radiating electrodes. In the case above, there is a demand for reducing a size of the patch antenna and improving radiation characteristics of the patch antenna.

It is therefore a feature of the present disclosure to reduce a size of a multilayer substrate including a plurality of radiating conductor layers and to improve radiation characteristics of the plurality of radiating conductor layers.

Solution to Problem

A multilayer substrate according to an aspect of the present disclosure includes:

a multilayer body having a structure in which at least one first insulator layer and at least one second insulator layer are laminated in a Z-axis direction, in which a dielectric constant of the at least one second insulator layer is lower than a dielectric constant of the at least one first insulator layer;

a first radiating conductor layer provided to the multilayer body to be in contact with the first insulator layer;

a second radiating conductor layer provided to the multilayer body to be in contact with the second insulator layer, positioned in a positive direction of a Z-axis relative to the first radiating conductor layer, and overlapping the first radiating conductor layer assuming it is viewed in the Z-axis direction, in which a frequency of an electromagnetic wave radiated or received by the second radiating conductor layer is higher than a frequency of an electromagnetic wave radiated or received by the first radiating conductor layer, or an area of the second radiating conductor layer is smaller than an area of the first radiating conductor layer;

a first planar ground conductor layer that is positioned in a negative direction of the Z-axis relative to the first radiating conductor layer and overlaps the first radiating conductor layer and the second radiating conductor layer assuming it is viewed in the Z-axis direction; and a first ground conductor layer that overlaps neither the first radiating conductor layer nor the second radiating conductor layer and is positioned in the positive direction of the Z-axis relative to the first radiating conductor layer assuming it is viewed in the Z-axis direction.

Advantageous Effects of Disclosure

With the use of the multilayer substrate according to the present disclosure, a size of a multilayer substrate including a plurality of radiating conductor layers may be reduced, and radiation characteristics of the plurality of radiating conductor layers may be improved.

DESCRIPTION OF EMBODIMENTS

Embodiments

[Structure of Multilayer Substrate 10]

Figure 1:
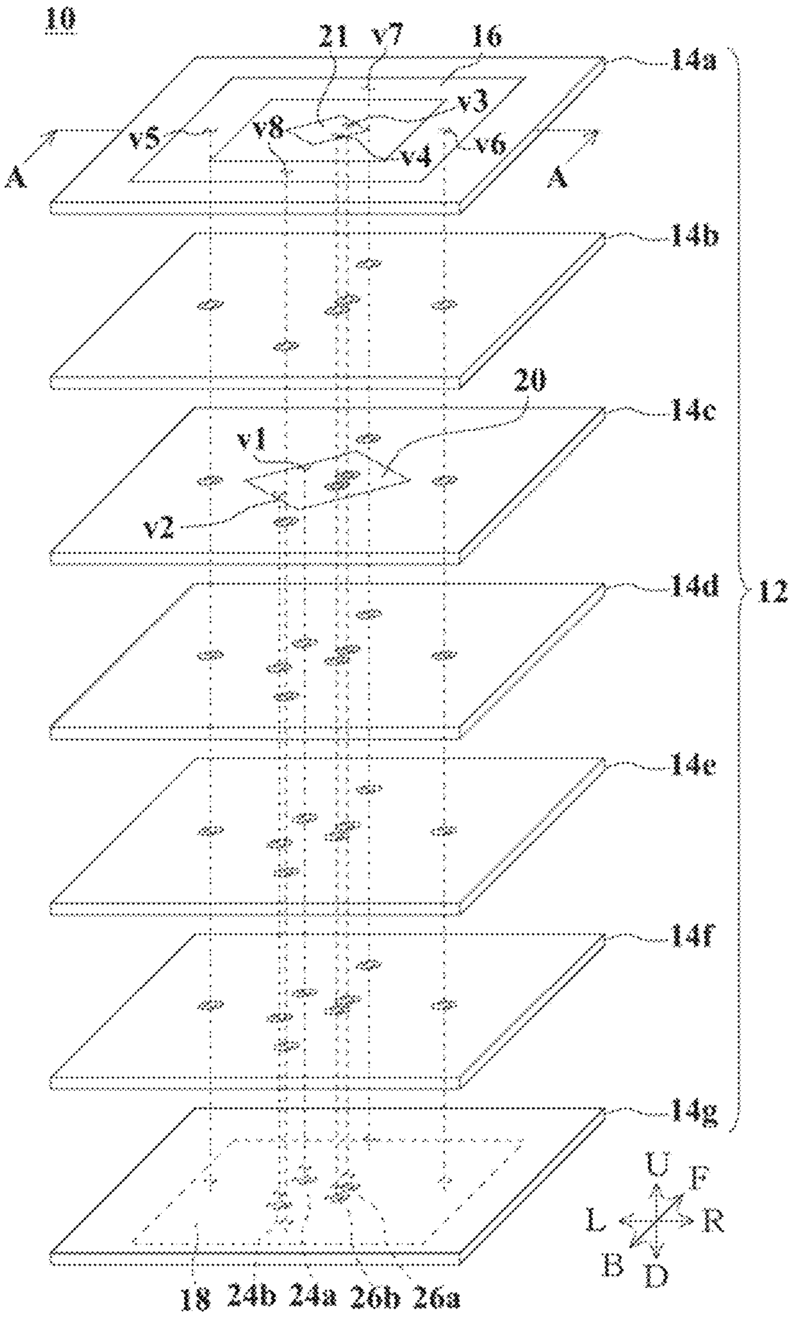
FIG. 1 is an exploded perspective view of a multilayer substrate 10.
Figure 2:
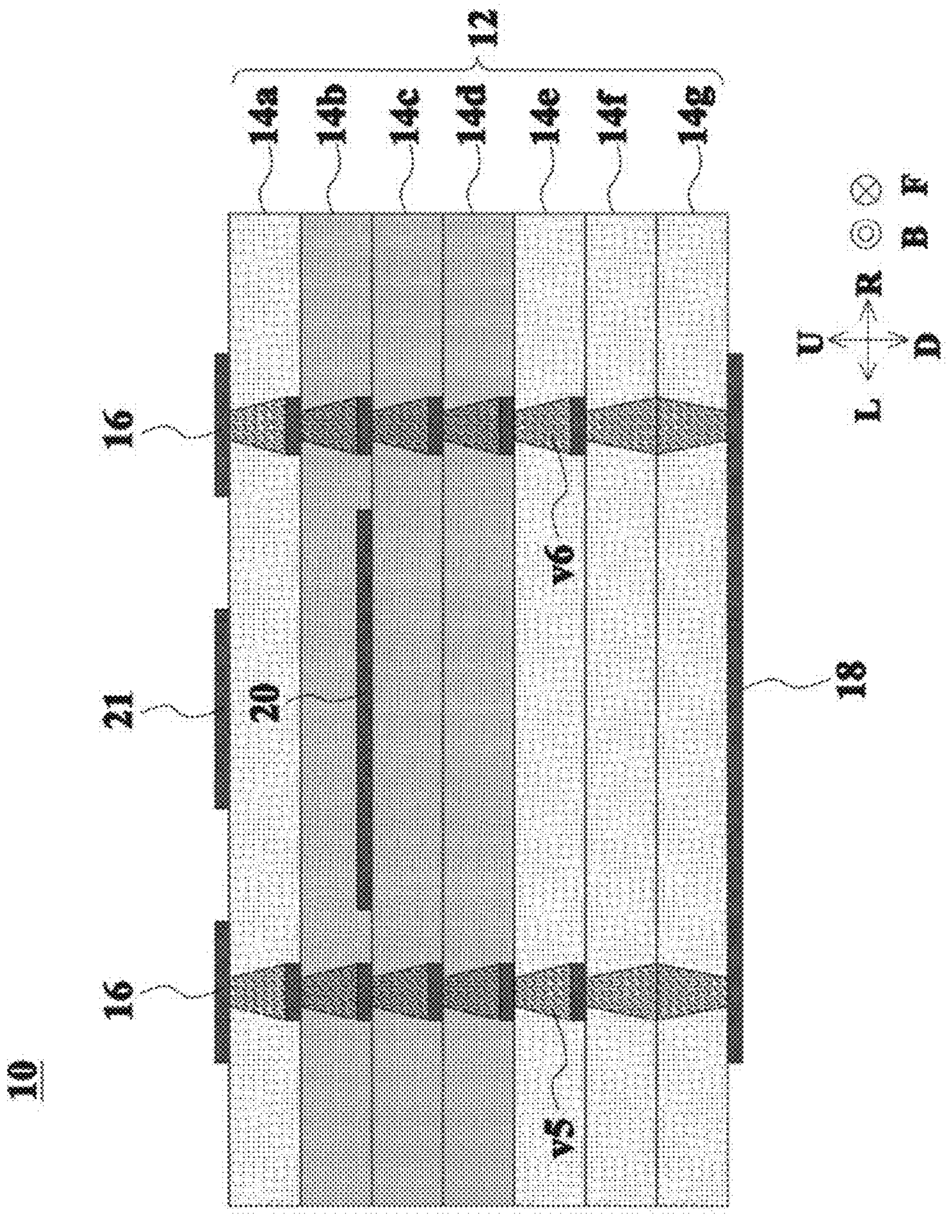
FIG. 2 is a sectional view of the multilayer substrate 10 taken along line A-A in FIG. 1.
Figure 3:
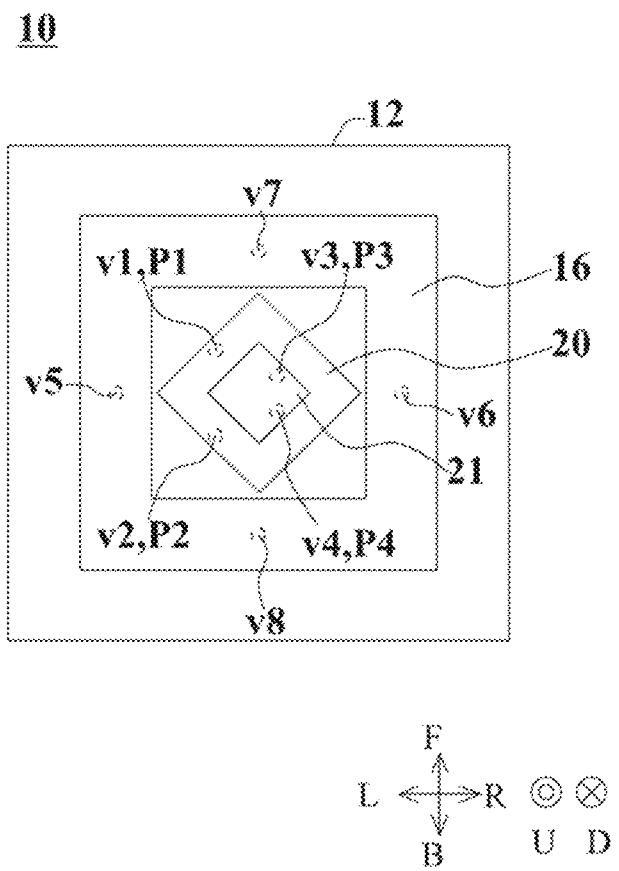
FIG. 3 is a perspective view of the multilayer substrate 10 seen through from the above.

A structure of a multilayer substrate 10 according to an embodiment of the present disclosure will be described below with reference to the drawings. FIG. 1 is an exploded perspective view of the multilayer substrate 10. FIG. 2 is a sectional view of the multilayer substrate 10 taken along line A-A in FIG. 1. FIG. 3 is a perspective view of the multilayer substrate 10 seen through from the above.

Hereinafter, a lamination direction of a multilayer body 12 of the multilayer substrate 10 is defined as an up-down direction. The up-down direction coincides with a Z-axis direction. An upward direction is a positive direction of a Z-axis. A downward direction is a negative direction of the Z-axis. Assuming the multilayer substrate 10 is viewed in the up-down direction, two directions in which sides of the multilayer substrate 10 extend are defined as a left-right direction and a front-back direction, respectively. The left-right direction coincides with an X-axis direction. The front-back direction coincides with a Y-axis direction. The left-right direction is orthogonal to the up-down direction. The front-back direction is orthogonal to the up-down direction and the left-right direction. A definition of directions in the present description is an example. Consequently, a direction of the multilayer substrate 10 in actual use could not coincide with a direction in the present description. Further, the up-down direction may be reversed in each drawing. In the same way, the left-right direction may be reversed in each drawing. The front-back direction may be reversed in each drawing.

Hereinafter, an X is a component or a member of the multilayer substrate 10. In the present description, each portion of the X is defined as follows, unless otherwise specified. A front portion of the X may be equivalent to a front half of the X. A back portion of the X may be equivalent to a back half of the X. A left portion of the X may be equivalent to a left half of the X. A right portion of the X may be equivalent to a right half of the X. An upper portion of the X may be equivalent to an upper half of the X. A lower portion of the X may be equivalent to a lower half of the X. A front end of the X may be equivalent to an end in a front direction of the X. A back end of the X may be equivalent to an end in a back direction of the X. A left end of the X may be equivalent to an end in a left direction of the X. A right end of the X may be equivalent to an end in a right direction of the X. An upper end of the X may be equivalent to an end in the upward direction of the X. A lower end of the X may be equivalent to an end in the downward direction of the X. A front end portion of the X may be equivalent to the front end of the X and the vicinity thereof. A back end portion of the X may be equivalent to the back end of the X and the vicinity thereof. A left end portion of the X may be equivalent to the left end of the X and the vicinity thereof. A right end portion of the X may be equivalent to the right end of the X and the vicinity thereof. An upper end portion of the X may be equivalent to the upper end of the X and the vicinity thereof. A lower end portion of the X may be equivalent to the lower end of the X and the vicinity thereof.

The multilayer substrate 10 is used for an electronic device such as a mobile phone. As illustrated in FIG. 1, the multilayer substrate 10 includes the multilayer body 12, a first ground conductor layer 16, a planar ground conductor layer 18, a first radiating conductor layer 20, a second radiating conductor layer 21, outer electrodes 24*a*, 24*b*, 26*a*, and 26*b*, and interlayer coupling conductors v1 to v8.

The multilayer body 12 has a plate shape. As illustrated in FIG. 1 and FIG. 2, the multilayer body 12 has a rectangular shape assuming it is viewed in the up-down direction. The multilayer body 12 has a structure in which insulator layers 14*b* to 14*d* (first insulator layers), an insulator layer 14*a* (second insulator layer), and insulator layers 14*e* to 14*g* (third insulator layers) are laminated in the Z-axis direction. The insulator layers 14*a* to 14*g* are arranged in this order from an up side to a down side. A dielectric constant of the insulator layer 14*a* (second insulator layer) is lower than a dielectric constant of each of the insulator layers 14*b* to 14*d* (first insulator layers). A dielectric constant of each of the insulator layers 14*e* to 14*g* (third insulator layers) is lower than the dielectric constant of each of the insulator layers 14*b* to 14*d* (first insulator layers). In the present embodiment, the dielectric constant of the insulator layer 14*a* is equal to the dielectric constant of each of the insulator layers 14*e* to 14*g*. A material of each of the insulator layers 14*a* to 14*g* is a thermoplastic resin such as polyimide or liquid crystal polymer. Consequently, the multilayer body 12 has flexibility.

The first radiating conductor layer 20 radiates and/or receives a first radio frequency signal. The first radiating conductor layer 20 is provided to the multilayer body 12 to be in contact with the insulator layers 14*b* and 14*c* (first insulator layers). In the present embodiment, the first radiating conductor layer 20 is positioned on an upper main surface of the insulator layer 14*c*. As illustrated in FIG. 3, the first radiating conductor layer 20 has a rhombic shape having diagonal lines extending in the left-right direction (X-axis direction) and the front-back direction (Y-axis direction) assuming it is viewed in the up-down direction (Z-axis direction).

The second radiating conductor layer 21 radiates and/or receives a second radio frequency signal. The second radiating conductor layer 21 is provided to the multilayer body 12 to be in contact with the insulator layer 14*a* (second insulator layer). In the present embodiment, the second radiating conductor layer 21 is positioned on an upper main surface of the insulator layer 14*a*. With this, the second radiating conductor layer 21 is positioned above the first radiating conductor layer 20 (in the positive direction of the Z-axis). A distance in the up-down direction between the second radiating conductor layer 21 and the first radiating conductor layer 20 is ¼ of a wavelength of the second radio frequency signal.

Further, as illustrated in FIG. 3, the second radiating conductor layer 21 overlaps the first radiating conductor layer 20 assuming it is viewed in the up-down direction (Z-axis direction). As illustrated in FIG. 3, the second radiating conductor layer 21 has a rhombic shape having diagonal lines extending in the left-right direction (X-axis direction) and the front-back direction (Y-axis direction) assuming it is viewed in the up-down direction (Z-axis direction). Note that an area of the second radiating conductor layer 21 is smaller than an area of the first radiating conductor layer 20. Consequently, assuming it is viewed in the up-down direction, four sides of the first radiating conductor layer 20 do not overlap the second radiating conductor layer 21. With this, a frequency of the second radio frequency signal (electromagnetic wave) radiated or received by the second radiating conductor layer 21 is higher than a frequency of the first radio frequency signal (electromagnetic wave) radiated or received by the first radiating conductor layer 20.

As illustrated in FIG. 1 and FIG. 2, the planar ground conductor layer 18 is provided to the multilayer body 12. More specifically, the planar ground conductor layer 18 (first planar ground conductor layer) is positioned below the first radiating conductor layer 20 (in the negative direction of the Z-axis). The planar ground conductor layer 18 is provided on a lower main surface of the insulator layer 14*g*. As illustrated in FIG. 1, the planar ground conductor layer 18 has a rectangular shape assuming it is viewed in the up-down direction. Long sides of the planar ground conductor layer 18 extend in the left-right direction. Short sides of the planar ground conductor layer 18 extend in the front-back direction. Assuming it is viewed in the up-down direction (Z-axis direction), the planar ground conductor layer 18 (first planar ground conductor layer) overlaps the first radiating conductor layer 20 and the second radiating conductor layer 21. The planar ground conductor layer 18 is coupled to a ground potential.

The first ground conductor layer 16 is provided to the multilayer body 12. More specifically, the first ground conductor layer 16 is positioned above the first radiating conductor layer 20 (in the positive direction of the Z-axis). In the present embodiment, the first ground conductor layer 16 is provided at the same position in the up-down direction (Z-axis direction) as the second radiating conductor layer 21. Consequently, the first ground conductor layer 16 is positioned on the upper main surface of the insulator layer 14*a*.

Further, the first ground conductor layer 16 does not overlap the first radiating conductor layer 20 or the second radiating conductor layer 21 assuming it is viewed in the up-down direction (Z-axis direction). In the present embodiment, assuming it is viewed in the up-down direction (Z-axis direction), the first ground conductor layer 16 is positioned on a left side (positive direction of an X-axis), a right side (negative direction of the X-axis), a front side (positive direction of a Y-axis), and a back side (negative direction of the Y-axis) of the first radiating conductor layer 20 and the second radiating conductor layer 21. Consequently, the first ground conductor layer 16 has an annular shape surrounding the first radiating conductor layer 20 and the second radiating conductor layer 21 assuming it is viewed in the up-down direction (Z-axis direction). In the present embodiment, the first ground conductor layer 16 has an outer edge and an inner edge of a rectangular shape having two sides extending in the front-back direction and two sides extending in the left-right direction.

The outer electrodes 24*a*, 24*b*, 26*a*, and 26*b* each are provided on the lower main surface of the insulator layer 14*g*. The outer electrodes 24*a*, 24*b*, 26*a*, and 26*b* each are in no contact with the planar ground conductor layer 18. Consequently, the outer electrodes 24*a*, 24*b*, 26*a*, and 26*b* each are positioned in an opening provided in the planar ground conductor layer 18. The outer electrodes 24*a* and 24*b* overlap the first radiating conductor layer 20 assuming it is viewed in the up-down direction. The outer electrodes 26*a* and 26*b* overlap the second radiating conductor layer 21 assuming it is viewed in the up-down direction. The first radio frequency signal is inputted to and outputted from the outer electrodes 24*a* and 24*b*. The second radio frequency signal is inputted to and outputted from the outer electrodes 26*a* and 26*b*.

The interlayer coupling conductor v1 electrically couples the first radiating conductor layer 20 and the outer electrode 24*a*. The interlayer coupling conductor v1 passes through the insulator layers 14*c* to 14*g* in the up-down direction. The interlayer coupling conductor v1 is positioned in the vicinity of a midpoint of a left front side of the first radiating conductor layer 20 assuming it is viewed in the up-down direction. A point at which the interlayer coupling conductor v1 is in contact with the first radiating conductor layer 20 is a first feed point P1.

The interlayer coupling conductor v2 electrically couples the first radiating conductor layer 20 and the outer electrode 24*b*. The interlayer coupling conductor v2 passes through the insulator layers 14*c* to 14*g* in the up-down direction. The interlayer coupling conductor v2 is positioned in the vicinity of a midpoint of a left back side of the first radiating conductor layer 20 assuming it is viewed in the up-down direction. A point at which the interlayer coupling conductor v2 is in contact with the first radiating conductor layer 20 is a second feed point P2.

The interlayer coupling conductor v3 electrically couples the second radiating conductor layer 21 and the outer electrode 26*a*. The interlayer coupling conductor v3 passes through the insulator layers 14*a* to 14*g* in the up-down direction. The interlayer coupling conductor v3 is positioned in the vicinity of a midpoint of a right front side of the second radiating conductor layer 21 assuming it is viewed in the up-down direction. A point at which the interlayer coupling conductor v3 is in contact with the second radiating conductor layer 21 is a third feed point P3.

The interlayer coupling conductor v4 electrically couples the second radiating conductor layer 21 and the outer electrode 26*b*. The interlayer coupling conductor v4 passes through the insulator layers 14*a* to 14*g* in the up-down direction. The interlayer coupling conductor v4 is positioned in the vicinity of a midpoint of a right back side of the second radiating conductor layer 21 assuming it is viewed in the up-down direction. A point at which the interlayer coupling conductor v4 is in contact with the second radiating conductor layer 21 is a fourth feed point P4.

The interlayer coupling conductors v5 to v8 each electrically couple the first ground conductor layer 16 and the planar ground conductor layer 18. The interlayer coupling conductors v5 to v8 each pass through the insulator layers 14*a* to 14*g*.

The first ground conductor layer 16, the planar ground conductor layer 18, the first radiating conductor layer 20, the second radiating conductor layer 21, and the outer electrodes 24*a*, 24*b*, 26*a*, and 26*b* are formed by, for example, patterning a copper foil attached to the upper main surface or the lower main surface of the insulator layers 14*a* to 14*g*. Each of the interlayer coupling conductors v1 to v8 is a via-hole conductor, for example. The via-hole conductor is formed by forming a through hole in the insulator layers 14*a* to 14*g*, filling the through hole with a conductive paste, and sintering the conductive paste.

In the multilayer substrate 10 described above, the first ground conductor layer 16, the planar ground conductor layer 18, and the first radiating conductor layer 20 function as a patch antenna that radiates or receives the first radio frequency signal. The first ground conductor layer 16, the planar ground conductor layer 18, and the second radiating conductor layer 21 function as a patch antenna that radiates or receives the second radio frequency signal.

Effects

With the use of the multilayer substrate 10, the multilayer substrate 10 including the first radiating conductor layer 20 and the second radiating conductor layer 21 may be reduced in size. More specifically, the second radiating conductor layer 21 overlaps the first radiating conductor layer 20 assuming it is viewed in the up-down direction. With this, assuming it is viewed in the up-down direction, an area of the multilayer substrate 10 is smaller than an area of a multilayer substrate in which two radiating conductors are arranged in the front-back direction or the left-right direction. Thus, with the use of the multilayer substrate 10, the multilayer substrate 10 including the first radiating conductor layer 20 and the second radiating conductor layer 21 may be reduced in size.

With the use of the multilayer substrate 10, the radiation characteristics of the first radiating conductor layer 20 may be improved. More specifically, the area of the first radiating conductor layer 20 is larger than the area of the second radiating conductor layer 21. Because of that, the first radiating conductor layer 20 is positioned near the first ground conductor layer 16 assuming it is viewed in the up-down direction. In the case above, a current of a reverse phase flows in the planar ground conductor layer 18. As a result, the radiation characteristics of the first radiating conductor layer 20 deteriorate.

In the multilayer substrate 10, the first radiating conductor layer 20 is provided to the multilayer body 12 to be in contact with the insulator layers 14*b* and 14*c*. The dielectric constant of each of the insulator layers 14*b* and 14*c* is higher than the dielectric constant of the insulator layer 14*a*. With this, a wavelength shortening effect makes it possible to reduce the first radiating conductor layer 20 in size without changing the frequency of the first radio frequency signal radiated or received by the first radiating conductor layer 20. This makes the first radiating conductor layer 20 be separated from the first ground conductor layer 16 assuming it is viewed in the up-down direction. Thus, a current of a reverse phase is less likely to flow in the planar ground conductor layer 18. As described above, with the use of the multilayer substrate 10, the radiation characteristics of the first radiating conductor layer 20 may be improved.

With the use of the multilayer substrate 10, the radiation characteristics of the second radiating conductor layer 21 may be improved. More specifically, the frequency of the second radio frequency signal radiated or received by the second radiating conductor layer 21 is higher than the frequency of the first radio frequency signal radiated or received by the first radiating conductor layer 20. Because of that, the area of the second radiating conductor layer 21 is smaller than the area of the first radiating conductor layer 20. In the case above, it is hard to improve the radiation characteristics of the second radiating conductor layer 21.

To deal with that, the second radiating conductor layer 21 is provided to the multilayer body 12 to be in contact with the insulator layer 14*a*. The dielectric constant of the insulator layer 14*a* is lower than the dielectric constant of each of the insulator layers 14*b* to 14*d*. Thus, the wavelength shortening effect is less likely to occur in the second radiating conductor layer 21. Because of that, the area of the second radiating conductor layer 21 may be increased without changing the frequency of the second radio frequency signal radiated or received by the second radiating conductor layer 21. As a result, with the use of the multilayer substrate 10, the radiation characteristics of the second radiating conductor layer 21 may be improved.

With the use of the multilayer substrate 10, an antenna gain of the first radiating conductor layer 20 for first polarization and an antenna gain of the first radiating conductor layer 20 for second polarization may be made close to each other. More specifically, the first radiating conductor layer 20 radiates and receives the first radio frequency signal of the first polarization at the first feed point P1. The first radiating conductor layer 20 radiates and receives the first radio frequency signal of the second polarization at the second feed point P2. In order to make the antenna gain of the first radiating conductor layer 20 for the first polarization and the antenna gain of the first radiating conductor layer 20 for the second polarization close to each other, a distance between the first feed point P1 and the first ground conductor layer 16 and a distance between the second feed point P2 and the first ground conductor layer 16 could be made close.

In the multilayer substrate 10, as illustrated in FIG. 3, the first radiating conductor layer 20 and the second radiating conductor layer 21 each have a rhombic shape having diagonal lines extending in the left-right direction and the front-back direction assuming it is viewed in the up-down direction. Further, the first ground conductor layer 16 is positioned on the left, right, front, and back sides of the first radiating conductor layer 20 and the second radiating conductor layer 21 assuming it is viewed in the up-down direction. With this, the distance between the first feed point P1 and the first ground conductor layer 16 and the distance between the second feed point P2 and the first ground conductor layer 16 become equal to each other. As a result, with the use of the multilayer substrate 10, the antenna gain of the first radiating conductor layer 20 for the first polarization and the antenna gain of the first radiating conductor layer 20 for the second polarization may be made close to each other. For the same reason, with the use of the multilayer substrate 10, the antenna gain of the second radiating conductor layer 21 for the first polarization and the antenna gain of the second radiating conductor layer 21 for the second polarization may be made close to each other.

With the use of the multilayer substrate 10, the antenna gain of the second radiating conductor layer 21 may be improved. More specifically, the second radiating conductor layer 21 radiates the second radio frequency signal in the upward direction and the downward direction. The second radio frequency signal radiated in the downward direction is reflected by the first radiating conductor layer 20 and travels in the upward direction. Here, the distance in the up-down direction between the second radiating conductor layer 21 and the first radiating conductor layer 20 is ¼ of the wavelength of the second radio frequency signal. This makes a phase of the second radio frequency signal be shifted by 180°. Further, the phase of the second radio frequency signal is shifted by 180° at the time of reflection. As a result, the phase of the second radio frequency signal radiated in the downward direction matches the phase of the second radio frequency signal radiated in the upward direction. Thus, with the use of the multilayer substrate 10, the antenna gain of the second radiating conductor layer 21 may be increased.

First Modification

Figure 4:
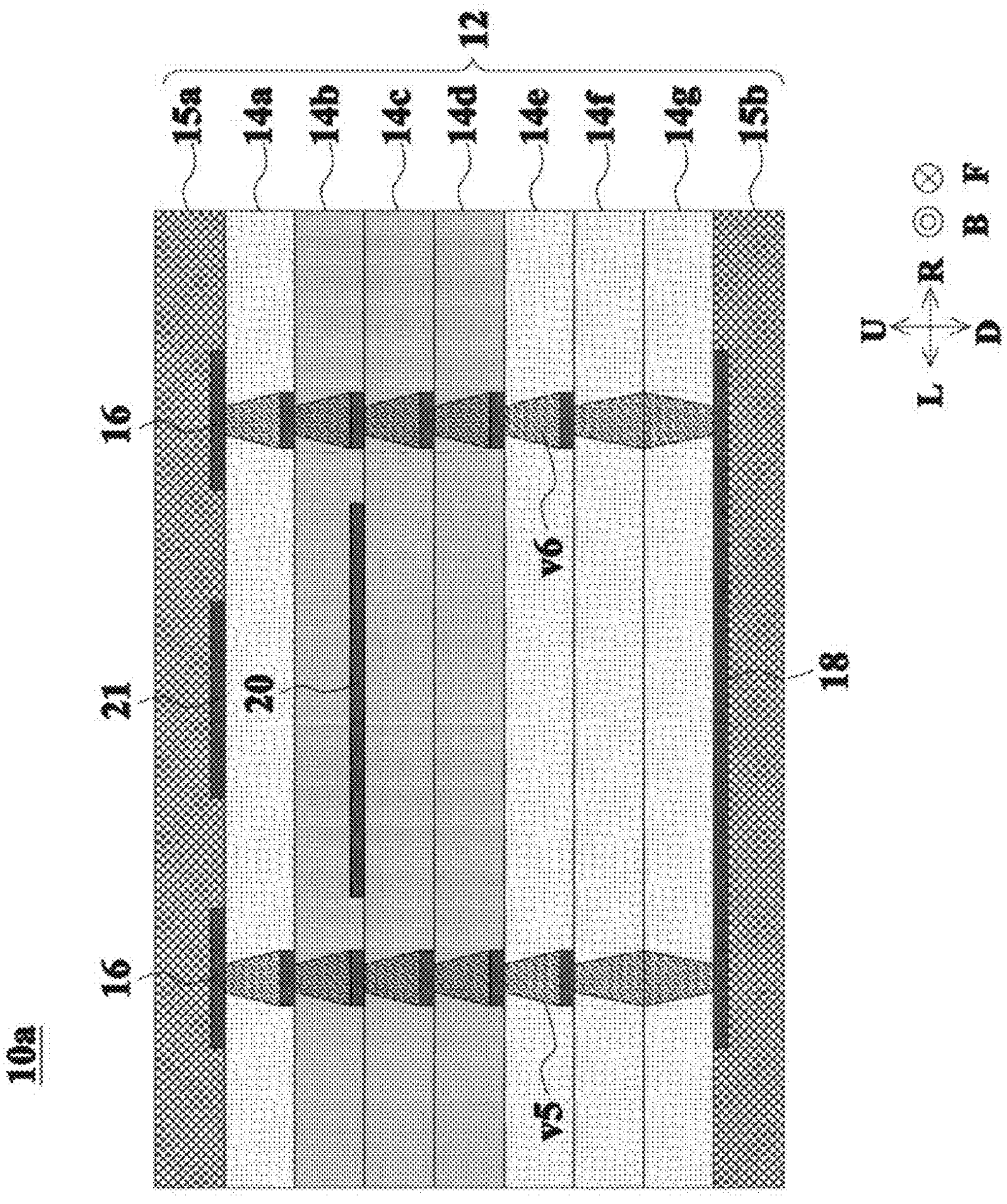
FIG. 4 is a sectional view of a multilayer substrate 10*a*.

A multilayer substrate 10*a* according to a first modification will be described below. FIG. 4 is a sectional view of the multilayer substrate 10*a*.

The multilayer substrate 10*a* is different from the multilayer substrate 10 in that the multilayer body 12 further includes protection layers 15*a* and 15*b*. The difference will be described below. The insulator layer 14*a* (second insulator layer) is positioned above the insulator layers 14*b* to 14*d* (first insulator layers) (in the positive direction of the Z-axis). The protection layer 15*a* is positioned above the insulator layer 14*a* (second insulator layer) (in the positive direction of the Z-axis). In the present embodiment, the protection layer 15*a* covers the upper main surface of the insulator layer 14*a*. Further, the protection layer 15*a* covers the second radiating conductor layer 21. The protection layer 15*b* covers the lower main surface of the insulator layer 14*g*. Further, the protection layer 15*b* covers the planar ground conductor layer 18. Note that the outer electrodes 24*a*, 24*b*, 26*a*, and 26*b* and part of the planar ground conductor layer 18 are exposed from the protection layer 15*b*.

A dielectric constant of each of the protection layers 15*a* and 15*b* is lower than the dielectric constant of the insulator layer 14*a* (second insulator layer). The second radiating conductor layer 21 is embedded in the protection layer 15*a*. With this, an area in which the second radiating conductor layer 21 is in contact with the protection layer 15*a* is larger than an area in which the second radiating conductor layer 21 is in contact with the insulator layer 14*a* (second insulator layer). Other structures of the multilayer substrate 10*a* are the same as those of the multilayer substrate 10. The multilayer substrate 10*a* may achieve the same effects as those of the multilayer substrate 10.

With the use of the multilayer substrate 10*a*, the radiation characteristics of the second radiating conductor layer 21 may be improved. More specifically, the dielectric constant of the protection layer 15*a* is lower than the dielectric constant of the insulator layer 14*a* (second insulator layer). The area in which the second radiating conductor layer 21 is in contact with the protection layer 15*a* is larger than the area in which the second radiating conductor layer 21 is in contact with the insulator layer 14*a* (second insulator layer). This makes the wavelength shortening effect be less likely to occur in the second radiating conductor layer 21. Because of that, the area of the second radiating conductor layer 21 may be increased without changing the frequency of the second radio frequency signal radiated or received by the second radiating conductor layer 21. As a result, with the use of the multilayer substrate 10*a*, the radiation characteristics of the second radiating conductor layer 21 may be improved.

Second Modification

Figure 5:
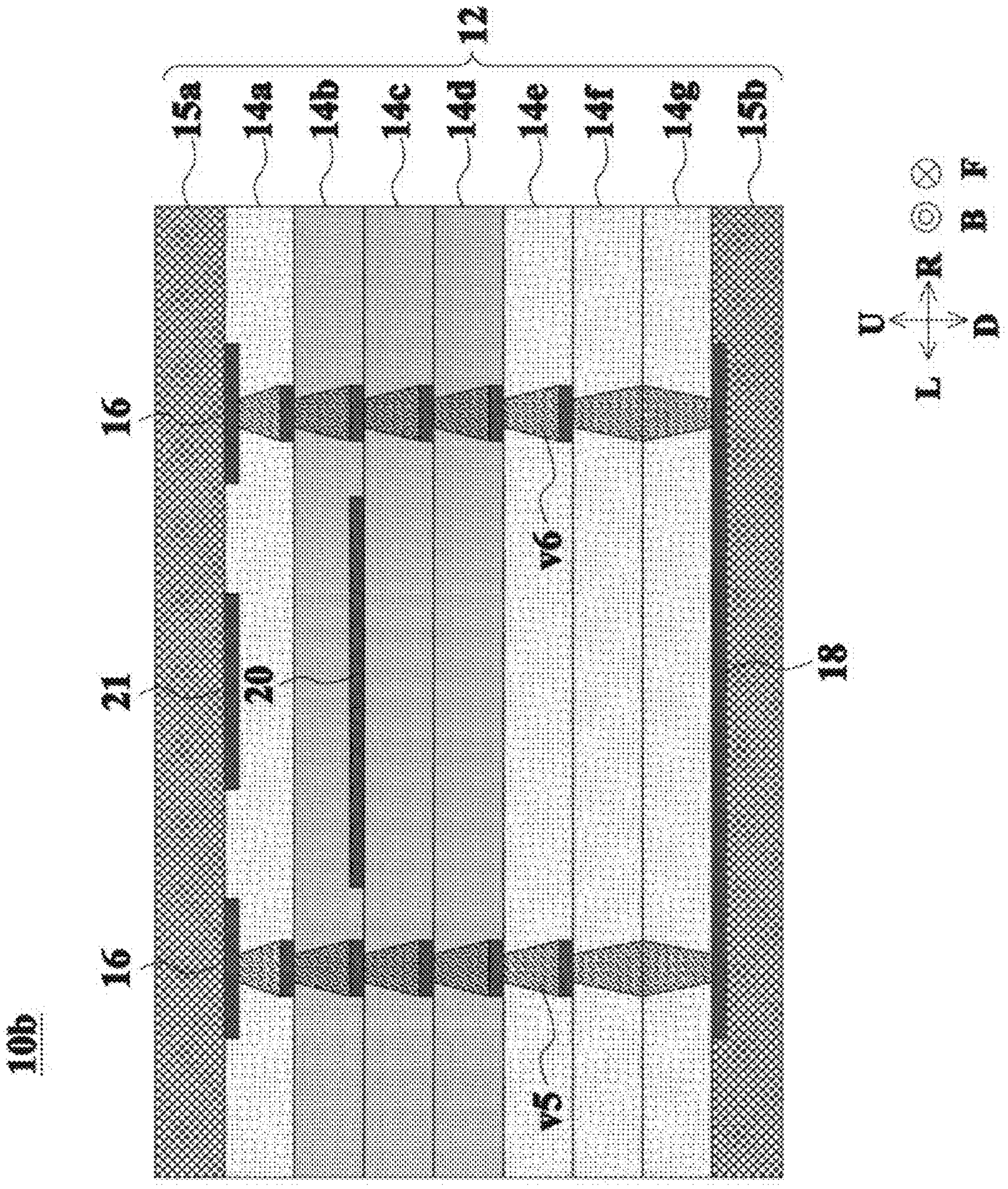
FIG. 5 is a sectional view of a multilayer substrate 10*b*.

A multilayer substrate 10*b* according to a second modification will be described below. FIG. 5 is a sectional view of the multilayer substrate 10*b*.

The multilayer substrate 10*b* is different from the multilayer substrate 10*a* in that the dielectric constant of each of the protection layers 15*a* and 15*b* is higher than the dielectric constant of the insulator layer 14*a* (second insulator layer). The second radiating conductor layer 21 is embedded in the insulator layer 14*a*. With this, an area in which the second radiating conductor layer 21 is in contact with the protection layer 15*a* is smaller than an area in which the second radiating conductor layer 21 is in contact with the insulator layer 14*a* (second insulator layer). Other structures of the multilayer substrate 10*b* are the same as those of the multilayer substrate 10*a*. The multilayer substrate 10*b* may achieve the same effects as those of the multilayer substrate 10*a*.

With the use of the multilayer substrate 10*b*, deterioration in the radiation characteristics of the second radiating conductor layer 21 may be suppressed. More specifically, the dielectric constant of each of the protection layers 15*a* and 15*b* is higher than the dielectric constant of the insulator layer 14*a* (second insulator layer). Note that the area in which the second radiating conductor layer 21 is in contact with the protection layer 15*a* is smaller than the area in which the second radiating conductor layer 21 is in contact with the insulator layer 14*a* (second insulator layer). This suppresses that the wavelength shortening effect excessively occurs in the second radiating conductor layer 21. Because of that, a decrease in the area of the second radiating conductor layer 21 may be suppressed without changing the frequency of the second radio frequency signal radiated or received by the second radiating conductor layer 21. As a result, with the use of the multilayer substrate 10*b*, deterioration in the radiation characteristics of the second radiating conductor layer 21 may be suppressed.

Third Modification

Figure 6:
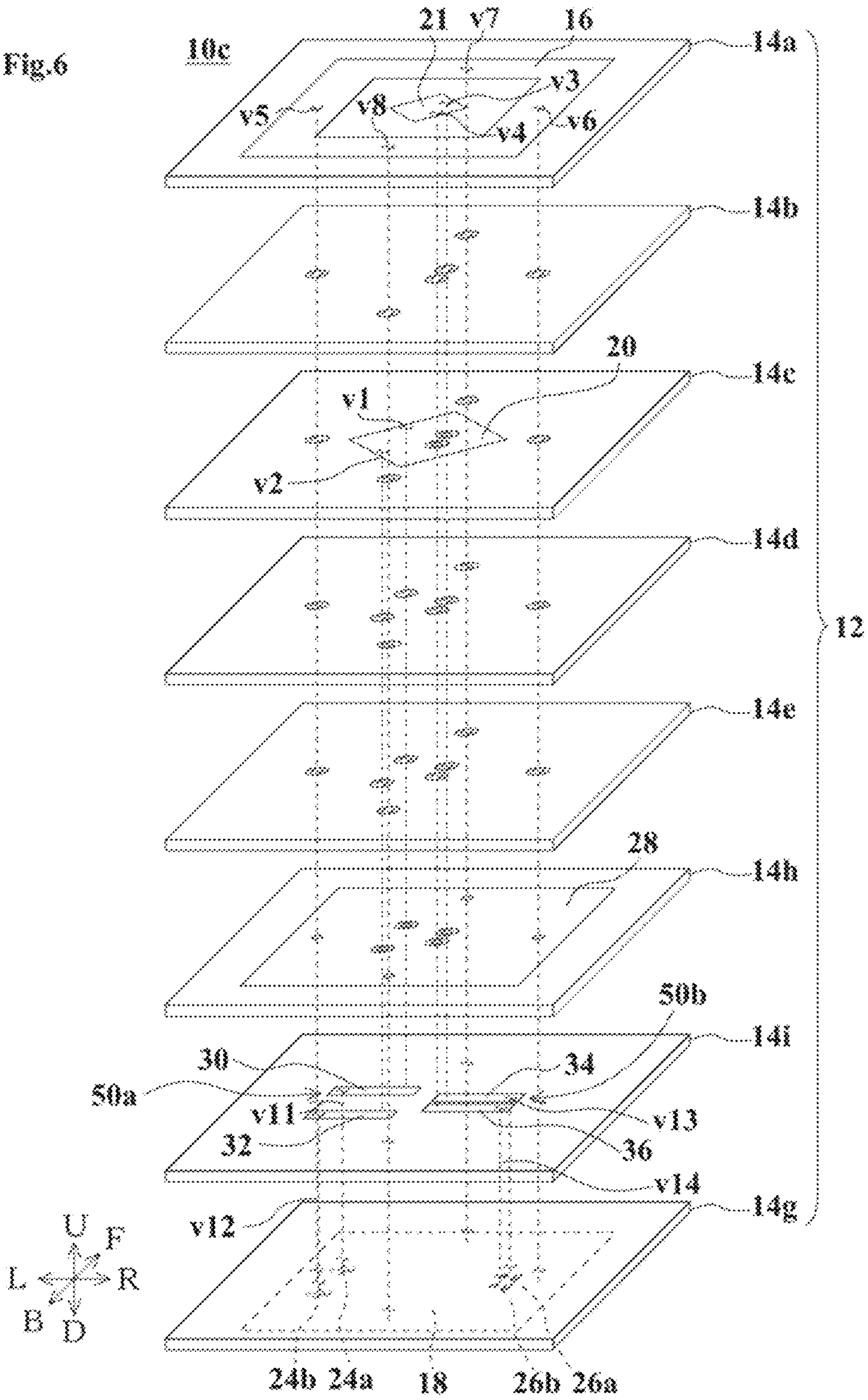
FIG. 6 is an exploded perspective view of a multilayer substrate 10*c*.

A multilayer substrate 10*c* according to a third modification will be described below. FIG. 6 is an exploded perspective view of the multilayer substrate 10*c*.

The multilayer substrate 10*c* is different from the multilayer substrate 10 in that the multilayer substrate 10*c* further includes a first matching circuit 50*a* and a second matching circuit 50*b*. More specifically, the multilayer body 12 has a structure in which the insulator layer 14*a* (second insulator layer), the insulator layers 14*b* to 14*d* (first insulator layers), and insulator layers 14*e*, 14 *h*, 14*i*, and 14*g* (third insulator layers) are arranged in this order in the downward direction (negative direction of the Z-axis). A dielectric constant of each of the insulator layers 14*e*, 14 *h*, 14*i*, and 14*g* (third insulator layers) is lower than a dielectric constant of each of the insulator layers 14*b* to 14*d* (first insulator layers).

The multilayer substrate 10*c* further includes a planar ground conductor layer 28, first signal conductor layers 30 and 32, second signal conductor layers 34 and 36, and interlayer coupling conductors v11 to v14. The planar ground conductor layer 28 is positioned on an upper main surface of the insulator layer 14*h*.

The first signal conductor layers 30 and 32 and the second signal conductor layers 34 and 36 are positioned on an upper main surface of the insulator layer 14*i*. Consequently, the first signal conductor layers 30 and 32 and the second signal conductor layers 34 and 36 are positioned below the planar ground conductor layer 28 and above the planar ground conductor layer 18. The first signal conductor layers 30 and 32 and the second signal conductor layers 34 and 36 overlap the planar ground conductor layers 18 and 28 assuming it is viewed in the up-down direction. The first signal conductor layers 30 and 32 and the second signal conductor layers 34 and 36 each extend in the left-right direction.

The interlayer coupling conductor v1 electrically couples the first radiating conductor layer 20 and a right end portion of the first signal conductor layer 30. The interlayer coupling conductor v11 electrically couples a left end portion of the first signal conductor layer 30 and the outer electrode 24*a*.

The interlayer coupling conductor v2 electrically couples the first radiating conductor layer 20 and a right end portion of the first signal conductor layer 32. The interlayer coupling conductor v12 electrically couples a left end portion of the first signal conductor layer 32 and the outer electrode 24*b*.

The interlayer coupling conductor v3 electrically couples the second radiating conductor layer 21 and a left end portion of the second signal conductor layer 34. The interlayer coupling conductor v13 electrically couples a right end portion of the second signal conductor layer 34 and the outer electrode 26*a*.

The interlayer coupling conductor v4 electrically couples the second radiating conductor layer 21 and a left end portion of the second signal conductor layer 36. The interlayer coupling conductor v14 electrically couples a right end portion of the second signal conductor layer 36 and the outer electrode 26*b*.

As described above, the first signal conductor layers 30 and 32, the second signal conductor layers 34 and 36, and the planar ground conductor layers 18 and 28 have a stripline structure. With this, the first signal conductor layers 30 and 32 and the planar ground conductor layers 18 and 28 form the first matching circuit 50*a*. The second signal conductor layers 34 and 36 and the planar ground conductor layers 18 and 28 form the second matching circuit 50*b*.

As described above, the first matching circuit 50*a* is electrically coupled to the first radiating conductor layer 20 through the interlayer coupling conductors v1 and v2. The second matching circuit 50*b* is electrically coupled to the second radiating conductor layer 21 through the interlayer coupling conductors v3 and v4. The first matching circuit 50*a* and the second matching circuit 50*b* each are in contact with the insulator layers 14*e* to 14*g* (third insulator layers). Other structures of the multilayer substrate 10*c* are the same as those of the multilayer substrate 10, and thus a description thereof is omitted. The multilayer substrate 10*c* may achieve the same effects as those of the multilayer substrate 10.

With the use of the multilayer substrate 10*c*, the first matching circuit 50*a* and the second matching circuit 50*b* each are in contact with the insulator layers 14*e* to 14*g* (third insulator layers). The dielectric constant of each of the insulator layers 14*e* to 14*g* (third insulator layers) is lower than the dielectric constant of each of the insulator layers 14*b* to 14*d* (first insulator layers). With this, capacitance is less likely to be formed between the first signal conductor layers 30 and 32 and the planar ground conductor layers 18 and 28. Capacitance is less likely to be formed between the second signal conductor layers 34 and 36 and the planar ground conductor layers 18 and 28. Consequently, assuming a line width of each of the first signal conductor layers 30 and 32 and a line width of each of the second signal conductor layers 34 and 36 are increased, the capacitance value does not become excessively large. Thus, a resistance value of each of the first signal conductor layers 30 and 32 and a resistance value of each of the second signal conductor layers 34 and 36 may be lowered while maintaining a characteristic impedance of each of the first matching circuit 50*a* and the second matching circuit 50*b* at a desired characteristic impedance.

Fourth Modification

Figure 7:
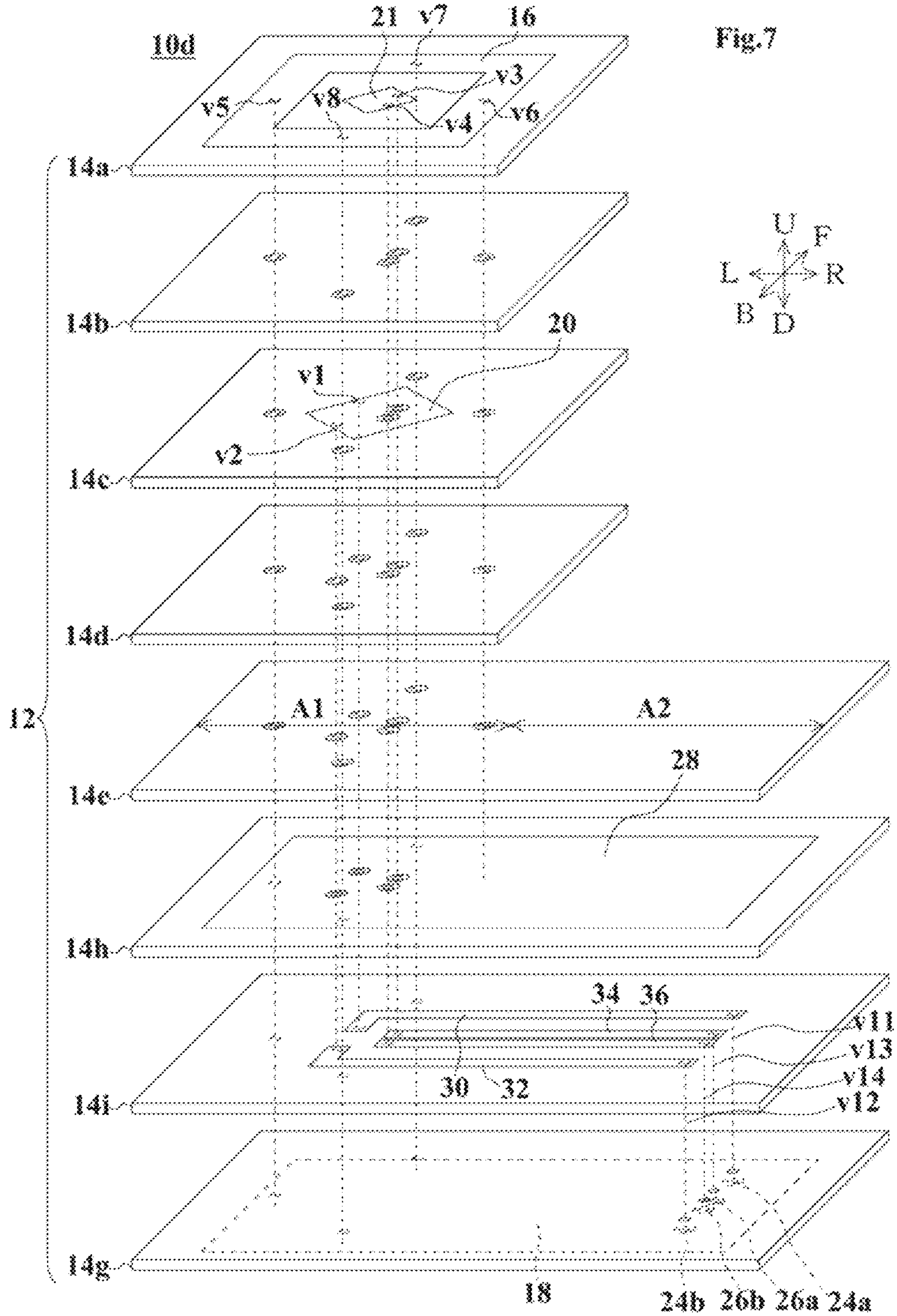
FIG. 7 is an exploded perspective view of a multilayer substrate 10*d*.

A multilayer substrate 10*d* according to a fourth modification will be described below. FIG. 7 is an exploded perspective view of the multilayer substrate 10*d*.

The multilayer substrate 10*d* is different from the multilayer substrate 10*c* in the structure of the multilayer body 12. The multilayer body 12 has a first region A1 and a second region A2. The first region A1 is a region where the insulator layer 14*a* (first insulator layer), the insulator layers 14*b* to 14*d* (second insulator layers), and the insulator layers 14*e*, 14 *h*, 14*i*, and 14*j* (third insulator layers) are present assuming it is viewed in the up-down direction (Z-axis direction). The second region A2 is a region where none of the insulator layer 14*a* (second insulator layer) and the insulator layers 14*b* to 14*d* (first insulator layers) are present, and the insulator layers 14*e*, 14 *h*, 14*i*, and 14*g* (third insulator layers) are present assuming it is viewed in the up-down direction (Z-axis direction).

The first signal conductor layer 30 is electrically coupled to the first radiating conductor layer 20 through the interlayer coupling conductor v1. The first signal conductor layer 32 is electrically coupled to the first radiating conductor layer 20 through the interlayer coupling conductor v2. The second signal conductor layer 34 is electrically coupled to the second radiating conductor layer 21 through the interlayer coupling conductor v3. The second signal conductor layer 36 is electrically coupled to the second radiating conductor layer 21 through the interlayer coupling conductor v4. The first signal conductor layers 30 and 32 and the second signal conductor layers 34 and 36 are in contact with the insulator layers 14*h* and 14*i* (third insulator layers), and extend from the first region A1 to the second region A2. Other structures of the multilayer substrate 10*d* are the same as those of the multilayer substrate 10*c*, and thus a description thereof will be omitted. The multilayer substrate 10*d* may achieve the same effects as those of the multilayer substrate 10*c*.

In the multilayer substrate 10*d*, the resistance value of each of the first signal conductor layers 30 and 32 and the resistance value of each of the second signal conductor layers 34 and 36 may be lowered for the same reason as in the multilayer substrate 10*c*. With this, even assuming the first signal conductor layers 30 and 32 and the second signal conductor layers 34 and 36 become long, insertion loss is less likely to occur in the first signal conductor layers 30 and 32 and the second signal conductor layers 34 and 36.

In the multilayer substrate 10*d*, a thickness of the second region A2 in the up-down direction is smaller than a thickness of the first region A1 in the up-down direction. Thus, the second region A2 is more deformable than the first region A1. This makes it possible to use the multilayer substrate 10*d* with the second region A2 being bent.

Fifth Modification

Figure 8:
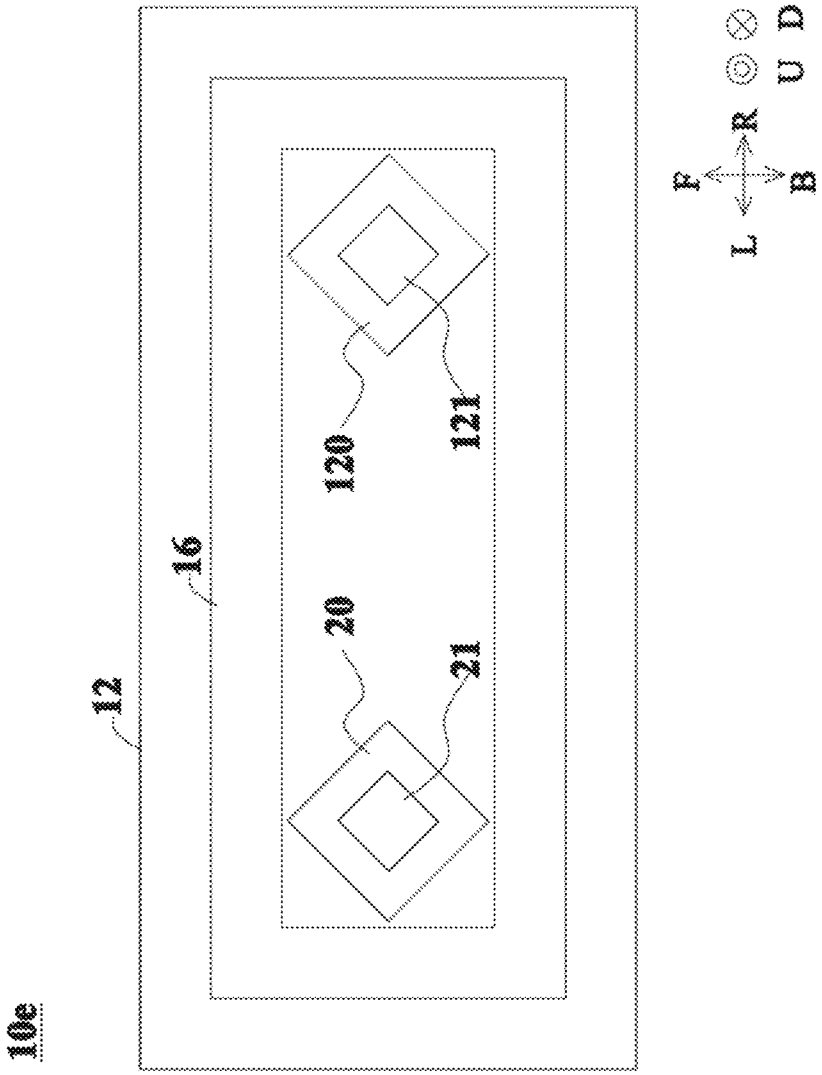
FIG. 8 is a perspective view of a multilayer substrate 10*e* seen through from the above.

A multilayer substrate 10*e* according to a fifth modification will be described below. FIG. 8 is a perspective view of the multilayer substrate 10*e* seen through from the above.

The multilayer substrate 10*e* is different from the multilayer substrate 10 in that the multilayer substrate 10*e* further includes a third radiating conductor layer 120 and a fourth radiating conductor layer 121. The third radiating conductor layer 120 is provided to the multilayer body 12 to be in contact with the insulator layers 14*b* and 14*c* (first insulator layers). The fourth radiating conductor layer 121 is provided to the multilayer body 12 to be in contact with the insulator layer 14*a* (second insulator layer). The fourth radiating conductor layer 121 is positioned above the third radiating conductor layer 120 (in the positive direction of the Z-axis), and overlaps the third radiating conductor layer 120 assuming it is viewed in the up-down direction (Z-axis direction).

An area of the fourth radiating conductor layer 121 is smaller than an area of the third radiating conductor layer 120. With this, a frequency of a fourth radio frequency signal (electromagnetic wave) radiated or received by the fourth radiating conductor layer 121 is higher than a frequency of a third radio frequency signal (electromagnetic wave) radiated or received by the third radiating conductor layer 120.

The first ground conductor layer 16 has an annular shape surrounding the first radiating conductor layer 20, the second radiating conductor layer 21, the third radiating conductor layer 120, and the fourth radiating conductor layer 121 assuming it is viewed in the up-down direction (Z-axis direction). Other structures of the multilayer substrate 10*e* are the same as those of the multilayer substrate 10, and thus a description thereof is omitted. The multilayer substrate 10*e* may achieve the same effects as those of the multilayer substrate 10.

OTHER EMBODIMENTS

The multilayer substrate according to the present disclosure is not limited to the multilayer substrate 10, 10*a* to 10*e*, and can be modified within the scope of the gist thereof. Further, the structures of the multilayer substrate 10 and 10*a* to 10*e* may be used with any combination.

The number of first insulator layers could be one or more.

The number of second insulator layers could be one or more.

The number of third insulator layers could be one or more.

Note that any one of the following may be satisfied: a frequency of an electromagnetic wave radiated or received by the second radiating conductor layer 21 is higher than a frequency of an electromagnetic wave radiated or received by the first radiating conductor layer 20; and the area of the second radiating conductor layer 21 is smaller than the area of the first radiating conductor layer 20.

Note that any one of the following may be satisfied: a frequency of an electromagnetic wave radiated or received by the fourth radiating conductor layer 121 is higher than a frequency of an electromagnetic wave radiated or received by the third radiating conductor layer 120; and the area of the fourth radiating conductor layer 121 is smaller than the area of the third radiating conductor layer 120.

Any one of the interlayer coupling conductors v1 and v2 may be provided alone. Any one of the interlayer coupling conductors v3 and v4 may be provided alone.

Further, the interlayer coupling conductors v1 may be provided alone. In the case above, the interlayer coupling conductor v1 is coupled to both the first radiating conductor layer 20 and the second radiating conductor layer 21, and is coupled to the outer electrode 24*a* as well. Both the first radio frequency signal and the second radio frequency signal are inputted to and outputted from the outer electrode 24*a*. Assuming the first radiating conductor layer 20 receives the first radio frequency signal and the second radiating conductor layer 21 receives the second radio frequency signal, a duplexer is coupled to the outer electrode 24*a*, for example. The duplexer separates the first radio frequency signal and the second radio frequency signal from each other.

The dielectric constant of the insulator layer 14*a* is not necessarily equal to the dielectric constant of each of the insulator layers 14*e* to 14*g*.

The first ground conductor layer 16 does not necessarily have an annular shape.

The first radiating conductor layer 20 is sandwiched by the first insulator layers in the up-down direction. However, the first radiating conductor layer 20 may be in contact with the insulator layer 14*b* (first insulator layer) alone or may be in contact with the insulator layer 14*c* (first insulator layer) alone.

The second radiating conductor layer 21 may be sandwiched by the second insulator layers in the up-down direction.

At least one of the first matching circuit 50*a* and the second matching circuit 50*b* could be in contact with the insulator layers 14*e* to 14*g* (third insulator layers).

At least one of the first signal conductor layers 30 and 32 and the second signal conductor layers 34 and 36 could be in contact with the insulator layers 14*h* and 14*i* (third insulator layers).

The present disclosure has the following structure.

(1)

A multilayer substrate, comprising:

a multilayer body having a structure in which at least one first insulator layer and at least one second insulator layer are laminated in a Z-axis direction, in which a dielectric constant of the at least one second insulator layer is lower than a dielectric constant of the at least one first insulator layer;

a first radiating conductor layer provided to the multilayer body to be in contact with the first insulator layer;

a second radiating conductor layer provided to the multilayer body to be in contact with the second insulator layer, positioned in a positive direction of a Z-axis relative to the first radiating conductor layer, and overlapping the first radiating conductor layer assuming it is viewed in the Z-axis direction, in which a frequency of an electromagnetic wave radiated or received by the second radiating conductor layer is higher than a frequency of an electromagnetic wave radiated or received by the first radiating conductor layer, or an area of the second radiating conductor layer is smaller than an area of the first radiating conductor layer;

a first planar ground conductor layer that is positioned in a negative direction of the Z-axis relative to the first radiating conductor layer and overlaps the first radiating conductor layer and the second radiating conductor layer assuming it is viewed in the Z-axis direction; and a first ground conductor layer that overlaps neither the first radiating conductor layer nor the second radiating conductor layer and is positioned in the positive direction of the Z-axis relative to the first radiating conductor layer assuming it is viewed in the Z-axis direction.

(2)

The multilayer substrate according to (1), wherein a direction orthogonal to the Z-axis direction is defined as an X-axis direction, a direction orthogonal to the X-axis direction and the Z-axis direction is defined as a Y-axis direction, the first ground conductor layer is positioned in a positive direction of an X-axis, a negative direction of the X-axis a positive direction of a Y-axis, and a negative direction of the Y-axis of the first radiating conductor layer and the second radiating conductor layer assuming it is viewed in the Z-axis direction, and the first radiating conductor layer and the second radiating conductor layer have a rhombic shape having diagonal lines extending in the X-axis direction and the Y-axis direction assuming it is viewed in the Z-axis direction.

(3)

The multilayer substrate according to (1) or (2), wherein the multilayer body has a structure in which the at least one second insulator layer, the at least one first insulator layer, and at least one third insulator layer are arranged in order of the at least one second insulator layer, the at least one first insulator layer, and the at least one third insulator layer in the negative direction of the Z-axis, a dielectric constant of the at least one third insulator layer is lower than the dielectric constant of the at least one first insulator layer, the multilayer substrate further includes a first matching circuit electrically coupled to the first radiating conductor layer, and a second matching circuit electrically coupled to the second radiating conductor layer, and at least one of the first matching circuit and the second matching circuit is in contact with the at least one third insulator layer.

(4)

The multilayer substrate according to (1) or (2), wherein the multilayer body has a structure in which the at least one second insulator layer, the at least one first insulator layer, and at least one third insulator layer are arranged in order of the at least one second insulator layer, the at least one first insulator layer, and the at least one third insulator layer in the negative direction of the Z-axis, a dielectric constant of the at least one third insulator layer is lower than the dielectric constant of the at least one first insulator layer, the multilayer body has a first region where the at least one first insulator layer, the at least one second insulator layer, and the at least one third insulator layer are present assuming it is viewed in the Z-axis direction and a second region where neither the at least one first insulator layer nor the at least one second insulator layer is present and the at least one third insulator layer is present assuming it is viewed in the Z-axis direction, the multilayer substrate further includes a first signal conductor layer electrically coupled to the first radiating conductor layer, and a second signal conductor layer electrically coupled to the second radiating conductor layer, and at least one of the first signal conductor layer and the second signal conductor layer is in contact with the at least one third insulator layer and extends from the first region to the second region.

(5)

The multilayer substrate according to any one of (1) to (4), further comprising:

a third radiating conductor layer provided to the multilayer body to be in contact with the first insulator layer; and a fourth radiating conductor layer provided to the multilayer body to be in contact with the second insulator layer, positioned in the positive direction of the Z-axis relative to the third radiating conductor layer, and overlapping the third radiating conductor layer assuming it is viewed in the Z-axis direction, in which a frequency of an electromagnetic wave radiated or received by the fourth radiating conductor layer is higher than a frequency of an electromagnetic wave radiated or received by the third radiating conductor layer, or an area of the fourth radiating conductor layer is smaller than an area of the third radiating conductor layer, wherein the first ground conductor layer has an annular shape surrounding the first radiating conductor layer, the second radiating conductor layer, the third radiating conductor layer, and the fourth radiating conductor layer assuming it is viewed in the Z-axis direction.

(6)

The multilayer substrate according to any one of (1) to (5), wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is lower than the dielectric constant of the at least one second insulator layer, and an area of the second radiating conductor layer in contact with the protection layer is larger than an area of the second radiating conductor layer in contact with the at least one second insulator layer.

(7)

The multilayer substrate according to any one of (1) to (5), wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is higher than the dielectric constant of the at least one second insulator layer, and an area of the second radiating conductor layer in contact with the protection layer is smaller than an area of the second radiating conductor layer in contact with the at least one second insulator layer.

(8)

The multilayer substrate according to any one of (1) to (7), wherein the first ground conductor layer has an annular shape surrounding the first radiating conductor layer and the second radiating conductor layer assuming it is viewed in the Z-axis direction.

REFERENCE SIGNS LIST

10, 10*a* to 10*e* MULTILAYER SUBSTRATE
12 MULTILAYER BODY
14*a* to 14*j* INSULATOR LAYER
15*a*, 15*b* PROTECTION LAYER
16 FIRST GROUND CONDUCTOR LAYER
18, 28 PLANAR GROUND CONDUCTOR LAYER
20 FIRST RADIATING CONDUCTOR LAYER
21 SECOND RADIATING CONDUCTOR LAYER
24*a*, 24*b*, 26*a*, 26*b* OUTER ELECTRODE
30, 32 FIRST SIGNAL CONDUCTOR LAYER
34, 36 SECOND SIGNAL CONDUCTOR LAYER
50*a* FIRST MATCHING CIRCUIT
50*b* SECOND MATCHING CIRCUIT
120 THIRD RADIATING CONDUCTOR LAYER
121 FOURTH RADIATING CONDUCTOR LAYER
A1 FIRST REGION
A2 SECOND REGION
P1 FIRST FEED POINT
P2 SECOND FEED POINT
P3 THIRD FEED POINT
P4 FOURTH FEED POINT
v1 to v8, v11 to v14 INTERLAYER COUPLING CONDUCTOR

The invention claimed is:

1. A multilayer substrate, comprising:

a multilayer body having a structure in which at least one first insulator layer and at least one second insulator layer are laminated in a Z-axis direction, in which a dielectric constant of the at least one second insulator layer is lower than a dielectric constant of the at least one first insulator layer;

a first radiating conductor layer provided to the multilayer body to be in contact with the at least one first insulator layer;

a second radiating conductor layer provided to the multilayer body to be in contact with the at least one second insulator layer, positioned in a positive direction of a Z-axis relative to the first radiating conductor layer, and overlapping the first radiating conductor layer assuming it is viewed in the Z-axis direction, in which a frequency of an electromagnetic wave radiated or received by the second radiating conductor layer is higher than a frequency of an electromagnetic wave radiated or received by the first radiating conductor layer, or an area of the second radiating conductor layer is smaller than an area of the first radiating conductor layer;

a first planar ground conductor layer that is positioned in a negative direction of the Z-axis relative to the first radiating conductor layer and overlaps the first radiating conductor layer and the second radiating conductor layer assuming it is viewed in the Z-axis direction;

a first ground conductor layer that overlaps neither the first radiating conductor layer nor the second radiating conductor layer, is positioned in the positive direction of the Z-axis relative to the first radiating conductor layer, and has an annular shape surrounding the first radiating conductor layer and the second radiating conductor layer in a plan view assuming the multilayer substrate is viewed in the Z-axis direction; and a matching circuit electrically connected to at least one of the first radiating conductor layer and the second radiating conductor layer, wherein the matching circuit is provided in a layer different from the at least one first insulator layer and the at least one second insulator layer.

2. The multilayer substrate according to claim 1, wherein a direction orthogonal to the Z-axis direction is defined as an X-axis direction, a direction orthogonal to the X-axis direction and the Z-axis direction is defined as a Y-axis direction, the first ground conductor layer is positioned in a positive direction of an X-axis, a negative direction of the X-axis, a positive direction of a Y-axis, and a negative direction of the Y-axis of the first radiating conductor layer and the second radiating conductor layer assuming it is viewed in the Z-axis direction, and the first radiating conductor layer and the second radiating conductor layer have a rhombic shape having diagonal lines extending in the X-axis direction and the Y-axis direction assuming it is viewed in the Z-axis direction.

3. The multilayer substrate according to claim 2, wherein the multilayer body has a structure in which the at least one second insulator layer, the at least one first insulator layer, and at least one third insulator layer are arranged in order of the at least one second insulator layer, the at least one first insulator layer, and the at least one third insulator layer in the negative direction of the Z-axis, a dielectric constant of the at least one third insulator layer is lower than the dielectric constant of the at least one first insulator layer, the matching circuit includes a first matching circuit electrically coupled to the first radiating conductor layer, and a second matching circuit electrically coupled to the second radiating conductor layer, and at least one of the first matching circuit and the second matching circuit is in contact with the at least one third insulator layer.

4. The multilayer substrate according to claim 1, wherein the multilayer body has a structure in which the at least one second insulator layer, the at least one first insulator layer, and at least one third insulator layer are arranged in order of the at least one second insulator layer, the at least one first insulator layer, and the at least one third insulator layer in the negative direction of the Z-axis, a dielectric constant of the at least one third insulator layer is lower than the dielectric constant of the at least one first insulator layer, the matching circuit includes a first matching circuit electrically coupled to the first radiating conductor layer, and a second matching circuit electrically coupled to the second radiating conductor layer, and at least one of the first matching circuit and the second matching circuit is in contact with the at least one third insulator layer.

5. The multilayer substrate according to claim 1, wherein the multilayer body has a structure in which the at least one second insulator layer, the at least one first insulator layer, and at least one third insulator layer are arranged in order of the at least one second insulator layer, the at least one first insulator layer, and the at least one third insulator layer in the negative direction of the Z-axis, a dielectric constant of the at least one third insulator layer is lower than the dielectric constant of the at least one first insulator layer, the multilayer body has a first region where the at least one first insulator layer, the at least one second insulator layer, and the at least one third insulator layer are present assuming it is viewed in the Z-axis direction and a second region where neither the at least one first insulator layer nor the at least one second insulator layer is present and the at least one third insulator layer is present assuming it is viewed in the Z-axis direction, the multilayer substrate further includes a first signal conductor layer electrically coupled to the first radiating conductor layer, and a second signal conductor layer electrically coupled to the second radiating conductor layer, and at least one of the first signal conductor layer and the second signal conductor layer is in contact with the at least one third insulator layer and extends from the first region to the second region.

6. The multilayer substrate according to claim 1, further comprising:

a third radiating conductor layer provided to the multilayer body to be in contact with the at least one first insulator layer; and a fourth radiating conductor layer provided to the multilayer body to be in contact with the at least one second insulator layer, positioned in the positive direction of the Z-axis relative to the third radiating conductor layer, and overlapping the third radiating conductor layer assuming it is viewed in the Z-axis direction, in which a frequency of an electromagnetic wave radiated or received by the fourth radiating conductor layer is higher than a frequency of an electromagnetic wave radiated or received by the third radiating conductor layer, or an area of the fourth radiating conductor layer is smaller than an area of the third radiating conductor layer, wherein the first ground conductor layer has an annular shape surrounding the first radiating conductor layer, the second radiating conductor layer, the third radiating conductor layer, and the fourth radiating conductor layer assuming it is viewed in the Z-axis direction.

7. The multilayer substrate according to claim 1, wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is lower than the dielectric constant of the at least one second insulator layer, and an area of the second radiating conductor layer in contact with the protection layer is larger than an area of the second radiating conductor layer in contact with the at least one second insulator layer.

8. The multilayer substrate according to claim 1, wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is higher than the dielectric constant of the at least one second insulator layer, and an area of the second radiating conductor layer in contact with the protection layer is smaller than an area of the second radiating conductor layer in contact with the at least one second insulator layer.

9. The multilayer substrate according to claim 2, further comprising:

a third radiating conductor layer provided to the multilayer body to be in contact with the at least one first insulator layer; and a fourth radiating conductor layer provided to the multilayer body to be in contact with the at least one second insulator layer, positioned in the positive direction of the Z-axis relative to the third radiating conductor layer, and overlapping the third radiating conductor layer assuming it is viewed in the Z-axis direction, in which a frequency of an electromagnetic wave radiated or received by the fourth radiating conductor layer is higher than a frequency of an electromagnetic wave radiated or received by the third radiating conductor layer, or an area of the fourth radiating conductor layer is smaller than an area of the third radiating conductor layer, wherein the first ground conductor layer has an annular shape surrounding the first radiating conductor layer, the second radiating conductor layer, the third radiating conductor layer, and the fourth radiating conductor layer assuming it is viewed in the Z-axis direction.

10. The multilayer substrate according to claim 3, further comprising:

a third radiating conductor layer provided to the multilayer body to be in contact with the at least one first insulator layer; and a fourth radiating conductor layer provided to the multilayer body to be in contact with the at least one second insulator layer, positioned in the positive direction of the Z-axis relative to the third radiating conductor layer, and overlapping the third radiating conductor layer assuming it is viewed in the Z-axis direction, in which a frequency of an electromagnetic wave radiated or received by the fourth radiating conductor layer is higher than a frequency of an electromagnetic wave radiated or received by the third radiating conductor layer, or an area of the fourth radiating conductor layer is smaller than an area of the third radiating conductor layer, wherein the first ground conductor layer has an annular shape surrounding the first radiating conductor layer, the second radiating conductor layer, the third radiating conductor layer, and the fourth radiating conductor layer assuming it is viewed in the Z-axis direction.

11. The multilayer substrate according to claim 2, wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is higher than the dielectric constant of the at least one second insulator layer, and an area of the second radiating conductor layer in contact with the protection layer is larger or smaller than an area of the second radiating conductor layer in contact with the at least one second insulator layer.

12. The multilayer substrate according to claim 3, wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is lower than the dielectric constant of the at least one second insulator layer, and an area of the second radiating conductor layer in contact with the protection layer is larger than an area of the second radiating conductor layer in contact with the at least one second insulator layer.

13. The multilayer substrate according to claim 3, wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is higher than the dielectric constant of the at least one second insulator layer, and an area of the second radiating conductor layer in contact with the protection layer is smaller than an area of the second radiating conductor layer in contact with the at least one second insulator layer.

14. A multilayer substrate, comprising:

a multilayer body having a structure in which at least one first insulator layer and at least one second insulator layer are laminated in a Z-axis direction, in which a dielectric constant of the at least one second insulator layer is lower than a dielectric constant of the at least one first insulator layer:

a first radiating conductor layer provided to the multilayer body to be in contact with the at least one first insulator layer;

a second radiating conductor layer provided to the multilayer body to be in contact with the at least one second insulator layer, positioned in a positive direction of a Z-axis relative to the first radiating conductor layer, and overlapping the first radiating conductor layer assuming it is viewed in the Z-axis direction, in which a frequency of an electromagnetic wave radiated or received by the second radiating conductor layer is higher than a frequency of an electromagnetic wave radiated or received by the first radiating conductor layer, or an area of the second radiating conductor layer is smaller than an area of the first radiating conductor layer;

a first planar ground conductor layer that is positioned in a negative direction of the Z-axis relative to the first radiating conductor layer and overlaps the first radiating conductor layer and the second radiating conductor layer assuming it is viewed in the Z-axis direction;

a first ground conductor layer that overlaps neither the first radiating conductor layer nor the second radiating conductor layer and is positioned in the positive direction of the Z-axis relative to the first radiating conductor layer assuming it is viewed in the Z-axis direction, wherein:

a direction orthogonal to the Z-axis direction is defined as an X-axis direction, a direction orthogonal to the X-axis direction and the Z-axis direction is defined as a Y-axis direction, the first ground conductor layer is positioned in a positive direction of an X-axis, a negative direction of the X-axis, a positive direction of a Y-axis, and a negative direction of the Y-axis of the first radiating conductor layer and the second radiating conductor layer assuming it is viewed in the Z-axis direction, the first radiating conductor layer and the second radiating conductor layer have a rhombic shape having diagonal lines extending in the X-axis direction and the Y-axis direction assuming it is viewed in the Z-axis direction, the multilayer body has a structure in which the at least one second insulator layer, the at least one first insulator layer, and at least one third insulator layer are arranged in order of the at least one second insulator layer, the at least one first insulator layer, and the at least one third insulator layer in the negative direction of the Z-axis, a dielectric constant of the at least one third insulator layer is lower than the dielectric constant of the at least one first insulator layer, the multilayer body has a first region where the at least one first insulator layer, the at least one second insulator layer, and the at least one third insulator layer are present assuming it is viewed in the Z-axis direction and a second region where neither the at least one first insulator layer nor the at least one second insulator layer is present and the at least one third insulator layer is present assuming it is viewed in the Z-axis direction, the multilayer substrate further includes a first signal conductor layer electrically coupled to the first radiating conductor layer, and a second signal conductor layer electrically coupled to the second radiating conductor layer, and at least one of the first signal conductor layer and the second signal conductor layer is in contact with the at least one third insulator layer and extends from the first region to the second region.

15. The multilayer substrate according to claim 14, further comprising:

a third radiating conductor layer provided to the multilayer body to be in contact with the at least one first insulator layer; and a fourth radiating conductor layer provided to the multilayer body to be in contact with the at least one second insulator layer, positioned in the positive direction of the Z-axis relative to the third radiating conductor layer, and overlapping the third radiating conductor layer assuming it is viewed in the Z-axis direction, in which a frequency of an electromagnetic wave radiated or received by the fourth radiating conductor layer is higher than a frequency of an electromagnetic wave radiated or received by the third radiating conductor layer, or an area of the fourth radiating conductor layer is smaller than an area of the third radiating conductor layer, wherein the first ground conductor layer has an annular shape surrounding the first radiating conductor layer, the second radiating conductor layer, the third radiating conductor layer, and the fourth radiating conductor layer assuming it is viewed in the Z-axis direction.

16. The multilayer substrate according to claim 15, wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is lower than the dielectric constant of the at least one second insulator layer, and an area of the second radiating conductor layer in contact with the protection layer is larger than an area of the second radiating conductor layer in contact with the at least one second insulator layer.

17. The multilayer substrate according to claim 15, wherein the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is higher than the dielectric constant of the at least one second insulator layer, and an area of the second radiating conductor layer in contact with the protection layer is smaller than an area of the second radiating conductor layer in contact with the at least one second insulator layer.

18. A multilayer substrate, comprising:

a multilayer body having a structure in which at least one first insulator layer and at least one second insulator layer are laminated in a Z-axis direction, in which a dielectric constant of the at least one second insulator layer is lower than a dielectric constant of the at least one first insulator layer;

a first radiating conductor layer provided to the multilayer body to be in contact with the at least one first insulator layer;

a second radiating conductor layer provided to the multilayer body to be in contact with the at least one second insulator layer, positioned in a positive direction of a Z-axis relative to the first radiating conductor layer, and overlapping the first radiating conductor layer assuming it is viewed in the Z-axis direction, in which a frequency of an electromagnetic wave radiated or received by the second radiating conductor layer is higher than a frequency of an electromagnetic wave radiated or received by the first radiating conductor layer, or an area of the second radiating conductor layer is smaller than an area of the first radiating conductor layer;

a first planar ground conductor layer that is positioned in a negative direction of the Z-axis relative to the first radiating conductor layer and overlaps the first radiating conductor layer and the second radiating conductor layer assuming it is viewed in the Z-axis direction;

a first ground conductor layer that overlaps neither the first radiating conductor layer nor the second radiating conductor layer and is positioned in the positive direction of the Z-axis relative to the first radiating conductor layer assuming it is viewed in the Z-axis direction, wherein:

a direction orthogonal to the Z-axis direction is defined as an X-axis direction, a direction orthogonal to the X-axis direction and the Z-axis direction is defined as a Y-axis direction, the first ground conductor layer is positioned in a positive direction of an X-axis, a negative direction of the X-axis, a positive direction of a Y-axis, and a negative direction of the Y-axis of the first radiating conductor layer and the second radiating conductor layer assuming it is viewed in the Z-axis direction, the first radiating conductor layer and the second radiating conductor layer have a rhombic shape having diagonal lines extending in the X-axis direction and the Y-axis direction assuming it is viewed in the Z-axis direction, the at least one second insulator layer is positioned in the negative direction of the Z-axis relative to the second radiating conductor layer, the multilayer body further includes a protection layer that is positioned in the positive direction of the Z-axis relative to the at least one second insulator layer and covers the second radiating conductor layer, a dielectric constant of the protection layer is lower than the dielectric constant of the at least one second insulator layer, and an area of the second radiating conductor layer in contact with the protection layer is larger or smaller than an area of the second radiating conductor layer in contact with the at least one second insulator layer.

* * * * *